(12) United States Patent
Choi et al.

(10) Patent No.: US 11,778,578 B2
(45) Date of Patent: *Oct. 3, 2023

(54) METHOD FOR SIDELINK COMMUNICATION BASED ON BEAMFORMING IN COMMUNICATION SYSTEM

(71) Applicants: Hyundai Motor Company, Seoul (KR); Kia Motors Corporation, Seoul (KR)

(72) Inventors: Su Han Choi, Gyeonggi-do (KR); Gene Back Hahn, Gyeonggi-do (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/712,621

(22) Filed: Apr. 4, 2022

(65) Prior Publication Data
US 2022/0232502 A1 Jul. 21, 2022

Related U.S. Application Data

(63) Continuation of application No. 16/533,240, filed on Aug. 6, 2019, now Pat. No. 11,323,975.

(60) Provisional application No. 62/715,020, filed on Aug. 6, 2018.

(30) Foreign Application Priority Data

Jul. 22, 2019 (KR) .................. 10-2019-0088259

(51) Int. Cl.
- *H04W 72/044* (2023.01)
- *H04B 7/06* (2006.01)
- *H04B 17/318* (2015.01)
- *H04W 56/00* (2009.01)
- *H04W 68/00* (2009.01)
- *H04W 4/40* (2018.01)

(52) U.S. Cl.
CPC ...... *H04W 56/0025* (2013.01); *H04B 7/0617* (2013.01); *H04B 7/0695* (2013.01); *H04B 17/318* (2015.01); *H04W 4/40* (2018.02); *H04W 68/005* (2013.01); *H04W 72/046* (2013.01)

(58) Field of Classification Search
CPC .......... H04W 72/046; H04W 56/0025; H04B 17/318; H04B 7/0617; H04B 7/0695
See application file for complete search history.

(56) References Cited

U.S. PATENT DOCUMENTS

| | | |
|---|---|---|
| 8,633,855 B2 | 1/2014 | Lee et al. |
| 11,323,975 B2 * | 5/2022 | Choi .................. H04B 7/0695 |
| 2017/0078915 A1 | 3/2017 | Sun et al. |
| 2019/0208395 A1 | 7/2019 | Chau et al. |

(Continued)

*Primary Examiner* — James P Duffy
(74) *Attorney, Agent, or Firm* — Fox Rothschild LLP

(57) ABSTRACT

An operation method of a first UE in a communication system is provided. The method includes transmitting to a second UE a an SL-SSB in an omni-directional scheme and transmitting the SL-SSB in a beamforming scheme when a response message for the SL-SSB transmitted in the omni-directional scheme is not received from the second UE. Additionally, sidelink communication with the second UE according to the beamforming scheme when a response message for the SL-SSB transmitted in the beamforming scheme is received from the second UE.

15 Claims, 7 Drawing Sheets

(56) References Cited

U.S. PATENT DOCUMENTS

2019/0349960 A1* 11/2019 Li .................... H04W 56/0015
2020/0015214 A1    1/2020 Si et al.
2020/0229132 A1*  7/2020 Chen .................... H04L 5/0053
2020/0275523 A1   8/2020 Zhang et al.

* cited by examiner

METHOD FOR SIDELINK COMMUNICATION BASED ON BEAMFORMING IN COMMUNICATION SYSTEM

CROSS-REFERENCE TO RELATED APPLICATIONS

This application is a Continuation Application of U.S. application Ser. No. 16/533,240, filed on Aug. 6, 2019, which claims the benefit of priorities to U.S. Provisional Patent Application No. 62/715,020, filed on Aug. 6, 2018 with the U.S. Patent and Trademark Office, and Korean Patent Application No. 10-2019-0088259, filed on Jul. 22, 2019 in the Korean Intellectual Property Office (KIPO), the entire contents of which are incorporated herein by reference.

BACKGROUND

1. Technical Field

The present disclosure relates generally to sidelink communication technology, and more specifically, to a technique for configuring a beam for sidelink communication.

2. Related Art

Various systems have been developed for processing of wireless data such as the fourth-generation (4G) communication system (e.g., Long Term Evolution (LTE) communication system or LTE-Advanced (LTE-A) communication system) and the fifth-generation (5G) communication system (e.g., New Radio (NR) communication system), which uses a frequency band higher than the frequency band of the 4G communication system. The 5G communication system supports Enhanced Mobile Broadband (eMBB) communications, Ultra-Reliable and Low-Latency communications (URLLC), massive Machine Type Communications (mMTC), and the like.

The 4G communication system and 5G communication system support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication. Vehicle-to-Network (V2N) communication, and the like.

In the cellular communication system, the V2X communications (e.g., C-V2X communications) may be performed based on "sidelink" communication technologies (e.g., Proximity-based Services (ProSe) communication technology. Device-to-Device (D2D) communication technology, or the like). For example, sidelink channels for vehicles participating in V2V communications can be established, and communications between the vehicles may be performed using the sidelink channels.

Meanwhile, when the sidelink communication is performed using a high frequency band, the coverage of the sidelink communication may be reduced. Accordingly, the sidelink communication may be performed based on a beamforming scheme. However, a sidelink communication method based on the beamforming scheme is not yet explicitly defined in the 3GPP LTE or NR specifications. Therefore, methods for configuring and managing beams for sidelink communications will be needed.

SUMMARY

Accordingly, exemplary embodiments of the present disclosure provide an apparatus and a method for configuring a beam for sidelink communication.

According to the exemplary embodiments of the present disclosure, an operation method of a first user equipment (UE) in a communication system may include transmitting to a second UE a sidelink synchronization signal block (SL-SSB) in an omni-directional scheme, transmitting the SL-SSB in a beamforming scheme when a response message for the SL-SSB transmitted in the omni-directional scheme is not received from the second UE, and performing sidelink (SL) communication with the second UE based on the beamforming scheme when a response message for the SL-SSB transmitted in the beamforming scheme is received from the second UE.

The SL-SSB may include at least one of a sidelink primary synchronization signal (SPSS), a sidelink secondary synchronization signal (SSSS), an index of a beam through which the SL-SSB may be transmitted, a threshold for a received signal quality of the SL-SSB, and information indicating a resource used for transmission of the response message.

The transmitting of the SL-SSB in a beamforming scheme may further include transmitting the SL-SSB to the second UE using n beams each of which covers a specific direction; and transmitting the SL-SSB to the second UE using m beams each of which covers a specific direction when a response message for the SL-SSB transmitted using the n beams is not received from the second UE. Each of n and m is a natural number, m is greater than n, a width of each of the n beams is wider than a width of each of the m beams, and a coverage of each of the n beams is shorter than a coverage of each of the m beams.

The response message may include at least one of an index of a beam through which the SL-SSB is received with a received signal strength equal to or greater than a threshold and information indicating a received signal quality of the SL-SSB. When the response message includes an index of a beam through which the SL-SSB is received with a received signal strength equal to or greater than a threshold, the SL communication may be performed using a beam that corresponds to the index of the beam.

When the response message includes indices of a plurality of beams through which the SL-SSB is received with a received signal strength equal to or greater than a threshold, the SL communication may be performed using a first beam through which the SL-SSB is received with a largest received signal strength among the plurality of beams, and beams other than the first beam among the plurality of beams may be configured as candidate beams. The SL communication may be performed in an analog beamforming scheme or a hybrid beamforming scheme.

Furthermore, according to exemplary embodiments of the present disclosure, an operation method of a first user equipment (UE) in a communication system may include receiving a sidelink synchronization signal block (SL-SSB) #L from a second UE; comparing a received signal strength of the SL-SSB #L with a threshold; and transmitting a response message for the SL-SSB #L to the second UE when the received signal strength of the SL-SSB #L is equal to or greater than the threshold. The SL-SSB #L may be transmitted using m beams by the second UE, and each of L and m is a natural number.

The SL-SSB #L may include at least one of a sidelink primary synchronization signal (SPSS), a sidelink secondary synchronization signal (SSSS), an index of a beam through which the SL-SSB #L may be transmitted, a threshold for a received signal quality of the SL-SSB #L, and information indicating a resource used for transmission of the response message. The response message may include at least one of an index of a beam through which the SL-SSB #L is received with a received signal strength equal to or greater than the threshold and information indicating a received signal quality of the SL-SSB #L. When the SL-SSB #1 is received through a plurality of beams, the response message may be transmitted in a direction that corresponds to a first beam of the plurality of beams, and beams other than the first beam among the plurality of beams may be configured as candidate beams.

The operation method may further include, before receiving of the SL-SSB #L, receiving an SL-SSB #(L−1) from the second UE; and comparing a received signal strength of the SL-SSB #(L−1) with the threshold. A response message for the SL-SSB #(L−1) is not transmitted to the second UE when the received signal strength of the SL-SSB #(L−1) is less than the threshold, the SL-SSB #(L−1) is transmitted using n beams by the second UE, n is a natural number, m is greater than n, a width of each of the n beams is wider than a width of each of the m beams, and a coverage of each of the n beams is shorter than a coverage of each of the m beams.

Furthermore, according to the exemplary embodiments of the present disclosure, a first user equipment (UE) in a communication system may include a processor, a transceiver operated by the processor, and a memory configured to store at least one instruction executable by the processor. Additionally, when executed by the processor, the at least one instruction may be configured to transmit to a second UE a sidelink synchronization signal block (SL-SSB) in an omni-directional scheme; transmit the SL-SSB in a beamforming scheme when a response message for the SL-SSB transmitted in the omni-directional scheme is not received from the second UE; and perform sidelink (SL) communication with the second UE according to the beamforming scheme when a response message for the SL-SSB transmitted in the beamforming scheme is received from the second UE.

The SL-SSB may include at least one of a sidelink primary synchronization signal (SPSS), a sidelink secondary synchronization signal (SSSS), an index of a beam through which the SL-SSB is transmitted, a threshold for a received signal quality of the SL-SSB, and information indicating a resource used for transmission of the response message.

When the SL-SSB is transmitted in the beamforming scheme, the at least one instruction may be configured to transmit the SL-SSB to the second UE using n beams each of which covers a specific direction; and transmit the SL-SSB to the second UE using m beams each of which covers a specific direction when a response message for the SL-SSB transmitted using the n beams is not received from the second UE. Each of n and m is a natural number, m is greater than n, a width of each of the n beams is wider than a width of each of the m beams, and a coverage of each of then beams is shorter than a coverage of each of them beams. The response message may include at least one of an index of a beam through which the SL-SSB is received with a received signal strength equal to or greater than a threshold and information indicating a received signal quality of the SL-SSB.

When the response message includes indices of a plurality of beams through which the SL-SSB is received with a received signal strength equal to or greater than a threshold, the SL communication may be performed using a first beam through which the SL-SSB is received with a largest received signal strength among the plurality of beams, and beams other than the first beam among the plurality of beams may be configured as candidate beams.

Furthermore, according to the exemplary embodiments of the present disclosure, a first user equipment (UE) in a communication system may include a processor, a transceiver operated by the processor, and a memory configured to store at least one instruction executable by the processor. Additionally, when executed by the processor, the at least one instruction may be configured to receive a sidelink synchronization signal block (SL-SSB) #L from a second UE; compare a received signal strength of the SL-SSB #L with a threshold; and transmit a response message for the SL-SSB #L to the second UE when the received signal strength of the SL-SSB #L is equal to or greater than the threshold. The SL-SSB #L may be transmitted using m beams by the second UE, and each of L and m is a natural number.

The SL-SSB #L may include at least one of a sidelink primary synchronization signal (SPSS), a sidelink secondary synchronization signal (SSSS), an index of a beam through which the SL-SSB #L is transmitted, a threshold for a received signal quality of the SL-SSB #L, and information indicating a resource used for transmission of the response message. The response message may include at least one of an index of a beam through which the SL-SSB #L is received with a received signal strength equal to or greater than the threshold and information indicating a received signal quality of the SL-SSB #L. When the SL-SSB #1 is received through a plurality of beams, the response message may be transmitted in a direction that corresponds to a first beam of the plurality of beams, and beams other than the first beam among the plurality of beams may be configured as candidate beams.

The at least one instruction may be further configured to receive an SL-SSB #(L−1) from the second UE; and compare a received signal strength of the SL-SSB #(L−1) with the threshold. A response message for the SL-SSB #(L−1) is not transmitted to the second UE when the received signal strength of the SL-SSB #(L−1) is less than the threshold, the SL-SSB #(L−1) is transmitted using n beams by the second UE, n is a natural number, m is greater than n, a width of each of the n beams is wider than a width of each of the m beams, and a coverage of each of the n beams is shorter than a coverage of each of the m beams.

According to the exemplary embodiments of the present disclosure, a user equipment (UE) #1 may transmit a sidelink synchronization signal block (SL-SSB), and when a response message for the SL-SSB is not received from a UE #2, the UE #1 may retransmit the SL-SSB using a beamforming scheme supporting a relatively longer coverage. In particular, sidelink communication may be performed using an appropriate transmission scheme based on the distance between the UE #1 and the UE #2, thereby improving the efficiency of the sidelink communication. Additionally, the interference caused by the sidelink communication may be reduced. Therefore, the performance of the communication system may be improved.

BRIEF DESCRIPTION OF DRAWINGS

Exemplary embodiments of the present disclosure will become more apparent by describing in detail exemplary embodiments of the present disclosure with reference to the accompanying drawings, in which.

Figure 1:
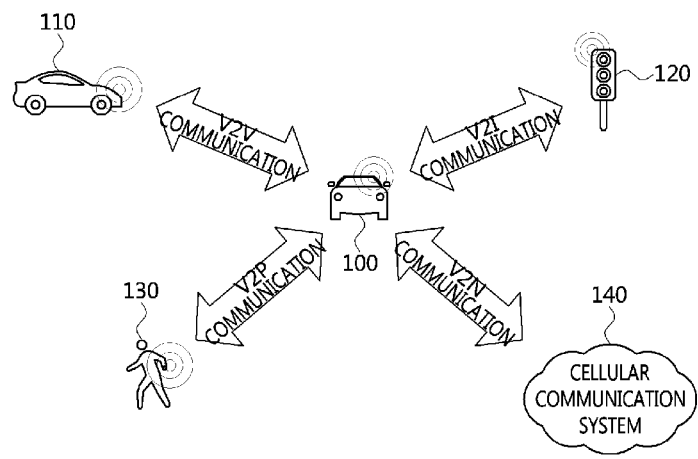
FIG. 1 is a conceptual diagram illustrating V2X communication scenarios according to an exemplary embodiment of the present disclosure.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

DETAILED DESCRIPTION

Exemplary embodiments of the present disclosure are disclosed herein. However, specific structural and functional details disclosed herein are merely representative for purposes of describing exemplary embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between." "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" or "controller" may refer to a hardware device that includes a memory and a processor. The memory is configured to store program instructions, and the processor is specifically programmed to execute the program instructions to perform one or more processes which are described further below. The control unit may control operation of units, modules, parts, or the like, as described herein. Moreover, it is understood that the below methods may be executed by an apparatus (e.g., communication node) comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, exemplary embodiments of the present disclosure will be described in greater detail with reference to the accompanying drawings. To facilitate general understanding in describing the present disclosure, the same components in the drawings are denoted with the same reference signs, and repeated description thereof will be omitted.

FIG. 1 is a conceptual diagram illustrating V2X communication scenarios. As shown in FIG. 1, the V2X communications may include Vehicle-to-Vehicle (V2V) communications, Vehicle-to-Infrastructure (V2I) communications, Vehicle-to-Pedestrian (V2P) communications. Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located within the vehicle 100 (e.g., the first vehicle)) and a second vehicle 110 (e.g., a communication node located within the vehicle 110 (e.g., the second vehicle)). Various driving information such as velocity, heading, time, position, and the like may be exchanged between the vehicles 100 and 110 via the V2V communications. For example, autonomous driving (e.g., platooning) may be supported based on the driving information exchanged via the V2V communications. The V2V communications supported in the cellular communication system 140 may be performed based on "sidelink" communication technologies (e.g., ProSe and D2D communication technologies, and the like). In particular, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 via the V2I communications. The V2I communications supported in the cellular communication system 140 may also be performed based on sidelink communication technologies (e.g., ProSe and D2D communication technologies, and the like). In particular, the communications between the vehicle 100 and the infrastructure 120 may be performed using at least one sidelink channel established between the vehicle 100 and the infrastructure 120.

The V2P communications may include communications between the first vehicle 100 (e.g., the communication node located within the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 via the V2P communications. The communication node located within the vehicle 100 or the communication node carried by the person 130 may be configured to generate an alarm that indicates a danger by detecting a dangerous situation based on the obtained driving information and movement information. The V2P communications supported in the cellular communication system 140 may be performed based on sidelink communication technologies (e.g., ProSe and D2D communication technologies, and the like). In particular, the communications between the communication node located within the vehicle 100 and the communication node carried by the person 130 may be performed using at least one sidelink channel established between the communication nodes.

The V2N communications may be communications between the first vehicle 100 (e.g., the communication node located in the vehicle 100) and a server connected via the cellular communication system 140. The V2N communications may be performed based on the 4G communication technology (e.g., LTE or LTE-A) or the 5G communication technology (e.g., NR). In addition, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
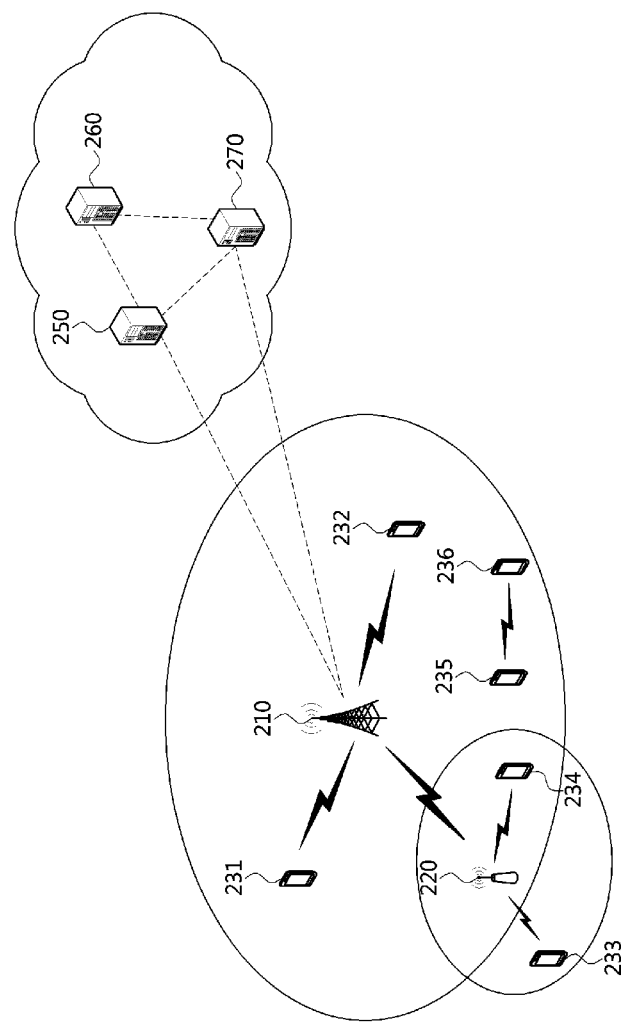
FIG. 2 is a conceptual diagram illustrating a cellular communication system according to an exemplary embodiment of the present disclosure.

FIG. 2 is a conceptual diagram illustrating exemplary embodiments of a cellular communication system. As shown in FIG. 2, a cellular communication system may include an access network, a core network, and the like. The access network may include a base station 210, a relay 220, User Equipment (UEs) 231 through 236, and the like. The UEs 231 through 236 may include communication nodes located within the vehicles 100 and 110 of FIG. 1, the communication node located within the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, or the core network constituted by the UPF 250, the SMF 260, and the AMF 270 may support the 4G communication technology as well as the 5G communication technology.

Additionally, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) including the cellular communication system may be configured to perform communications using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) including the cellular communication system may be configured as follows.

Figure 3:
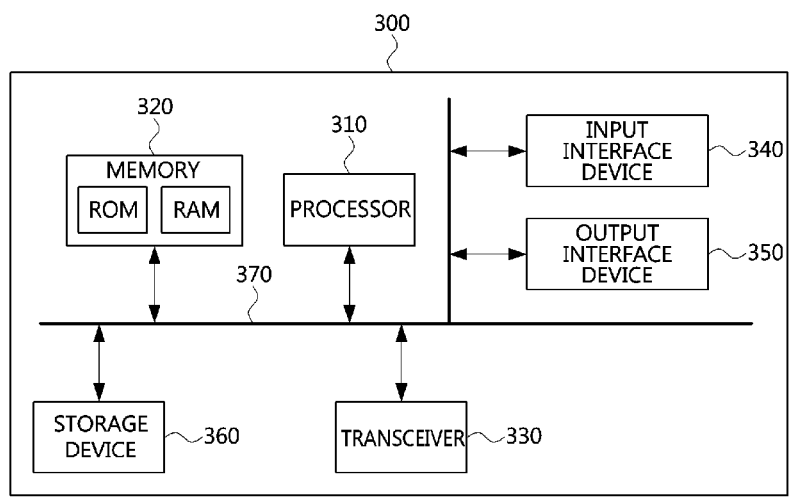
FIG. 3 is a conceptual diagram illustrating a communication node constituting a cellular communication system according to an exemplary embodiment of the present disclosure.

FIG. 3 is a conceptual diagram illustrating exemplary embodiments of a communication node constituting a cellular communication system. As shown in FIG. 3, a communication node 30W may include at least one processor 310, a memory 320, and a transceiver 330 connected to a network for performing communications. Additionally, the communication node 300 may further include an input interface device 340, an output interface device 350, a storage device 360, and the like. Each component included in the communication node 300 may be configured to communicate with each other as connected via a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may be configured to execute at least one instruction stored in at least one of the memory 320 and the storage device 360. The processor 310 may refer to a central processing unit (CPU), a graphics processing unit (GPU), or a dedicated processor on which methods in accordance with exemplary embodiments of the present disclosure are performed. Each of the memory 320 and the storage device 360 may include at least one of a volatile storage medium and a non-volatile storage medium. For example, the memory 320 may include at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may be configured to transmit signals received from the core network to the UEs 231 through 236 and the relay 220, and transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may be configured to communicate with the base station 210 after being connected to the base station 210.

The relay 220 may be connected to the base station 210 and may relay communications between the base station 210 and the UEs 233 and 234. In other words, the relay 220 may be configured to transmit signals received from the base station 210 to the UEs 233 and 234, and transmit signals received from the UEs 233 and 234 to the base station 210. The UE 234 may belong to both of the cell coverage of the base station 210 and the cell coverage of the relay 220, and the UE 233 may belong to the cell coverage of the relay 220. In other words, the UE 233 may be disposed outside the cell coverage of the base station 210. The UEs 233 and 234 may be connected to the relay 220 by performing a connection establishment procedure with the relay 220. The UEs 233 and 234 may be configured to communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may be configured to perform operations that correspond to the relays 220 and operations supported by the relays 220.

Particularly, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 maybe referred to as a small base station, a relay node, or the like. Each of the UEs 231 through 236 may be referred to as a terminal, an access terminal, a mobile terminal, a station, a subscriber station, a mobile station, a portable subscriber station a subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located within the first vehicle 100 of FIG. 1 and the UE 236 may be the communication node located within the second vehicle 110 of FIG. 1. When V2I communications are performed using the sidelink communication technique, the UE 235 may be the communication node located within first vehicle 100 of FIG. 1 and the UE 236 may be the communication node located within the infrastructure 120 of FIG. 1. When V2P communications are performed using the sidelink communication technique, the UE 235 may be the communication node located within first vehicle 100 of FIG. 1 and the UE 236 may be the communication node carried by the person 130 of FIG. 1.

The scenarios to which the sidelink communications are applied may be classified as shown below in Table 1 based on the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
|---|---|---|
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
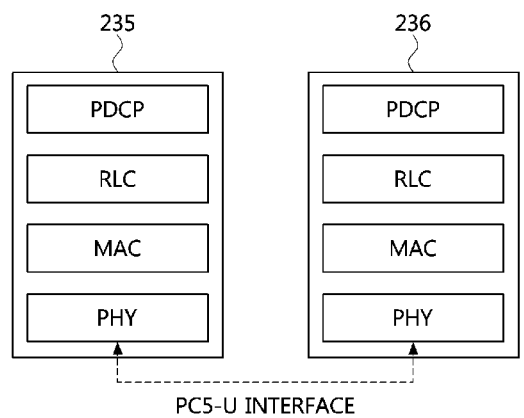
FIG. 4 is a block diagram illustrating a user plane protocol stack of an UE performing sidelink communication according to an exemplary embodiment of the present disclosure.

FIG. 4 is a block diagram illustrating exemplary embodiments of a user plane protocol stack of an UE performing sidelink communication. As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may include a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications and the layer 2-ID may be an ID configured for the V2X communications (e.g., V2X service). Additionally, in the sidelink communications, a hybrid automatic repeat request (HARQ) feedback operation may be supported, and an RLC acknowledged mode (RLC AM) or an RLC unacknowledged mode (RLC UM) may be supported. Meanwhile, a control plane protocol stack of the UEs (e.g., the UEs 235 and 236) performing sidelink communications may be configured as follows.

Figure 5:
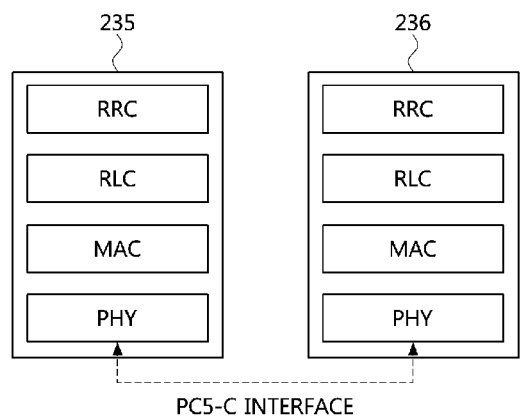
FIG. 5 is a block diagram illustrating a control plane protocol stack of an UE performing sidelink communication according to an exemplary embodiment of the present disclosure.
Figure 6:
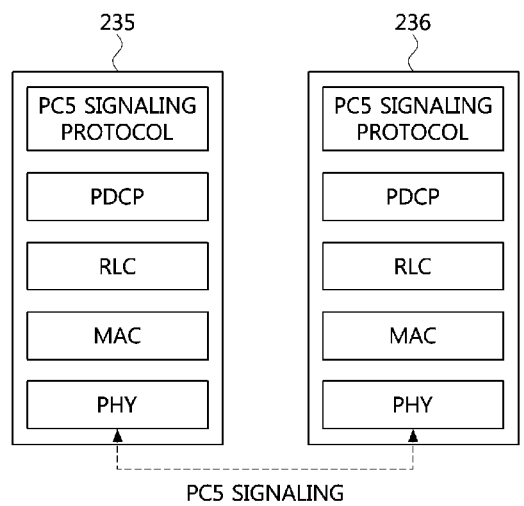
FIG. 6 is a block diagram illustrating a control plane protocol stack of an UE performing sidelink communication according to an exemplary embodiment of the present disclosure.

FIG. 5 is a block diagram illustrating a first exemplary embodiment of a control plane protocol stack of an UE performing sidelink communication, and FIG. 6 is a block diagram illustrating a second exemplary embodiment of a control plane protocol stack of an UE performing sidelink communication. As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). In addition, a demodulation reference signal (DM-RS), a synchronization signal, or the like may be used in the sidelink communications between the UEs 235 and 236. Meanwhile, a sidelink transmission mode (TM) may be classified into sidelink TMs 1 to 4 as shown below in Table 2.

TABLE 2

| Sidelink TM | Description |
|---|---|
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may be configured to perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure, etc.). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. Particularly, the sidelink control information may be transmitted via resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In particular, the sidelink control information may be transmitted via resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received via resources scheduled by the base station 210. When the sidelink TM 4 is supported, the resource pool for transmitting and receiving sidelink data may be configured by a dedicated RRC signaling procedure or a broadcast RRC signaling procedure. Particularly, the sidelink data may be transmitted and received via resources selected autonomously by the UE (e.g., UE 235 or 236) within the resource pool configured by the dedicated RRC signaling procedure or the broadcast RRC signaling procedure.

Furthermore, beamforming-based sidelink communication methods will be described. Even when a method (e.g., transmission or reception of a signal) to be performed at a first communication node among communication nodes is described, a corresponding second communication node may be configured to perform a method (e.g., reception or transmission of the signal) that corresponds to the method performed at the first communication node. In other words, when an operation of a UE #1 (e.g., first vehicle) is described, a corresponding UE #2 (e.g., second vehicle) may be configured to perform an operation that corresponds to the operation of the UE #1. Conversely, when an operation of the UE #2 (e.g., second vehicle) described, the corresponding UE #1 (e.g., first vehicle) may be configured to perform an operation that corresponds to the operation of the UE #2. In the exemplary embodiments described below, the operation of the vehicle may be the operation of the communication node located within the vehicle.

In the communication system, the sidelink communication may be performed in a beamforming scheme. For example, when a UE #2 is not present within coverage of a UE #1, beamforming-based sidelink communication may be performed. A beamforming level may be determined based on the distance between the UEs performing the sidelink communication, and the number of beams may be different based on the beamforming level. For example, the beamforming level may be defined based on Table 3 below.

TABLE 3

| Beamforming level ($L_{BF}$) | Number of beams ($N_{BF}$) | coverage | Beam width |
|---|---|---|---|
| 0 | 1 | ↑ decreasing | ↑ increasing |
| 1 | 4 | | |
| 2 | 6 | | |
| 3 | 8 | ↓ increasing | ↓ decreasing |

The width of each of the beams according to a beamforming level #1 may be wider than the width of each of the beams according to a beamforming level #2 or #3, and the coverage of each of the beams according to the beamforming level #1 may be shorter than the coverage of each of the beams according to the beam forming level #2 or #3. In other words, among the beamforming levels #1 to #3, the beam width according to the beamforming level #1 may be the widest, and the coverage of the beam according to the beamforming level #3 may be the longest.

Figure 7:
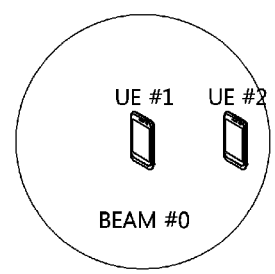
FIG. 7 is a conceptual diagram illustrating sidelink communication according to a beamforming level #0 according to an exemplary embodiment of the present disclosure.

FIG. 7 is a conceptual diagram illustrating a first exemplary embodiment of sidelink communication according to a beamforming level #0. As shown in FIG. 7, the UE #1 may be configured to perform sidelink communication with the UE #2 using a single beam. That is, the UE #1 may be configured to transmit a sidelink signal in an omni-directional scheme.

Figure 8:
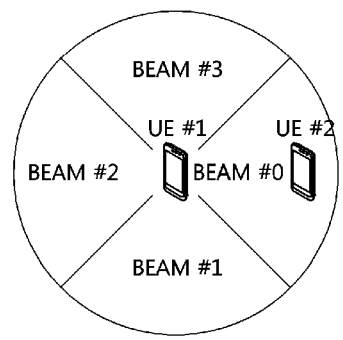
FIG. 8 is a conceptual diagram illustrating sidelink communication according to a beamforming level #1 according to an exemplary embodiment of the present disclosure.

FIG. 8 is a conceptual diagram illustrating a first exemplary embodiment of sidelink communication according to a beamforming level #1. As shown in FIG. 8, the UE #1 may be configured to perform sidelink communication using 4 beams. One beam among beams #0 to #3 may be determined as a beam (e.g., beam #0) for the sidelink communication between the UE #1 and the UE #2, and the sidelink communication may be performed using the determined beam.

Figure 9:
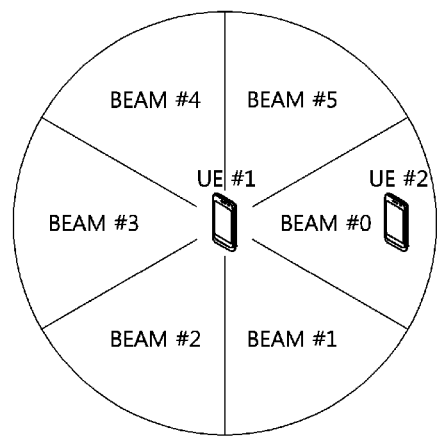
FIG. 9 is a conceptual diagram illustrating sidelink communication according to a beamforming level #2 according to an exemplary embodiment of the present disclosure.

FIG. 9 is a conceptual diagram illustrating a first exemplary embodiment of sidelink communication according to a beamforming level #2. As show in FIG. 9, the UE #1 may be configured to perform sidelink communication using 6 beams. One beam among beams #0 to #5 may be determined as a beam (e.g., beam #0) for the sidelink communication between the UE #1 and the UE #2, and the sidelink communication may be performed using the determined beam.

Figure 10:
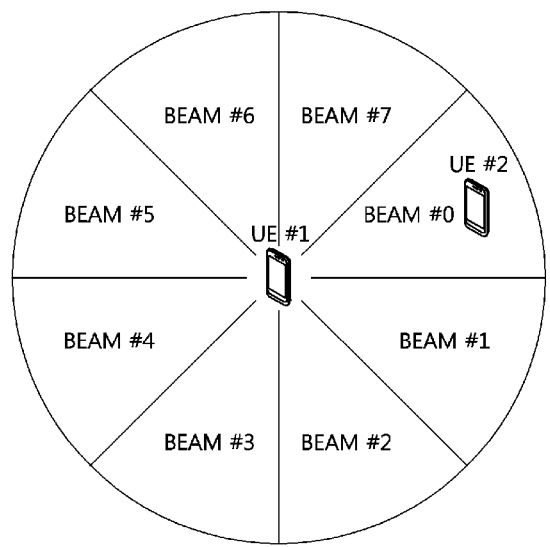
FIG. 10 is a conceptual diagram illustrating sidelink communication according to a beamforming level #3 according to an exemplary embodiment of the present disclosure.

FIG. 10 is a conceptual diagram illustrating a first exemplary embodiment of sidelink communication according to a beamforming level #3. As show in FIG. 10, the UE #1 may be configured to perform sidelink communication using 8 beams. One beam among beams #0 to #7 may be determined as a beam (e.g., beam #0) for the sidelink communication between the UE #1 and the UE #2, and the sidelink communication may be performed using the determined beam. Indices of the beams shown in FIGS. 7 to 10 may be configured as shown in Table 4 below

TABLE 4

| Beam | Index |
|---|---|
| 0 | 000 |
| 1 | 001 |
| 2 | 010 |
| 3 | 011 |
| 4 | 100 |
| 5 | 101 |
| 6 | 110 |
| 7 | 111 |

Configuration information for the beamforming-based sidelink communication may be configured by higher layer signaling. For example, the base station may be configured to generate beamforming (BF) configuration information including one or more of parameters listed in Table 5 below.

TABLE 5

| Parameter | | Description |
|---|---|---|
| $L_{BF}$ #0 | $N_{BF}$ | 0 |
| | $T_{SIGNAL}$ | Threshold of signal quality |
| | $R_F$ | Resource used for the UE to report to another UE received beam-related information |
| $L_{BF}$ #1 | $N_{BF}$ | 4 |
| | $P_{BS}$ | Beam sweeping periodicity |
| | $T_{SIGNAL}$ | Threshold of signal quality |
| | $T_{SPEED}$ | Threshold of UE speed |
| | $R_F$ | Resource used for the UE to report to another UE received beam-related information |
| $L_{BF}$ #2 | $N_{BF}$ | 6 |
| | $P_{BS}$ | Beam sweeping periodicity |
| | $T_{SIGNAL}$ | Threshold of signal quality |
| | $T_{SPEED}$ | Threshold of UE speed |

TABLE 5-continued

| Parameter | | Description |
| --- | --- | --- |
| | $R_F$ | Resource used for the UE to report to another UE received beam-related information |
| $L_{BF}$ #3 | $N_{BF}$ | 8 |
| | $P_{BS}$ | Beam sweeping periodicity |
| | $T_{SIGNAL}$ | Threshold of signal quality |
| | $T_{SPEED}$ | Threshold of UE speed |
| | $R_F$ | Resource used for the UE to report to another UE received beam-related information |

The UE may be configured to report to the base station information (i.e., received beam-related information) related to a beam through which a signal equal to or greater than $T_{SIGNAL}$ is received. A UE having a movement speed equal to or less than $T_{SPEED}$ may report the received beam-related information to the base station. The received beam related information reported from the UE to the base station may include at least one of a beam index, quality information regarding a signal received through the beam, and a UE speed. Each of $N_{BF}$, $P_{BS}$, $T_{SIGNAL}$, $T_{SPEED}$, and RF may be configured differently for each beamforming level.

The base station may be configured to transmit system information (e.g., a master information block (MIB), a system information block (SIB)) or an RRC message including the BF configuration information. The RRC message may be a cell-specific RRC message or a UE-specific RRC message. Alternatively, the base station may be configured to transmit the BF configuration information using a downlink control information (DCI) instead of the system information and the RRC message. In other words, the base station may be configured to transmit a DCI including the BF configuration information through physical control information (e.g., PDCCH). Accordingly, the UE may be configured to acquire the BF configuration information through at least one of the system information, the RRC message, and the DCI, and may be configured to perform the sidelink communication based on the BF configuration information. The beamforming-based side link communication may be performed as follows.

Figure 11:
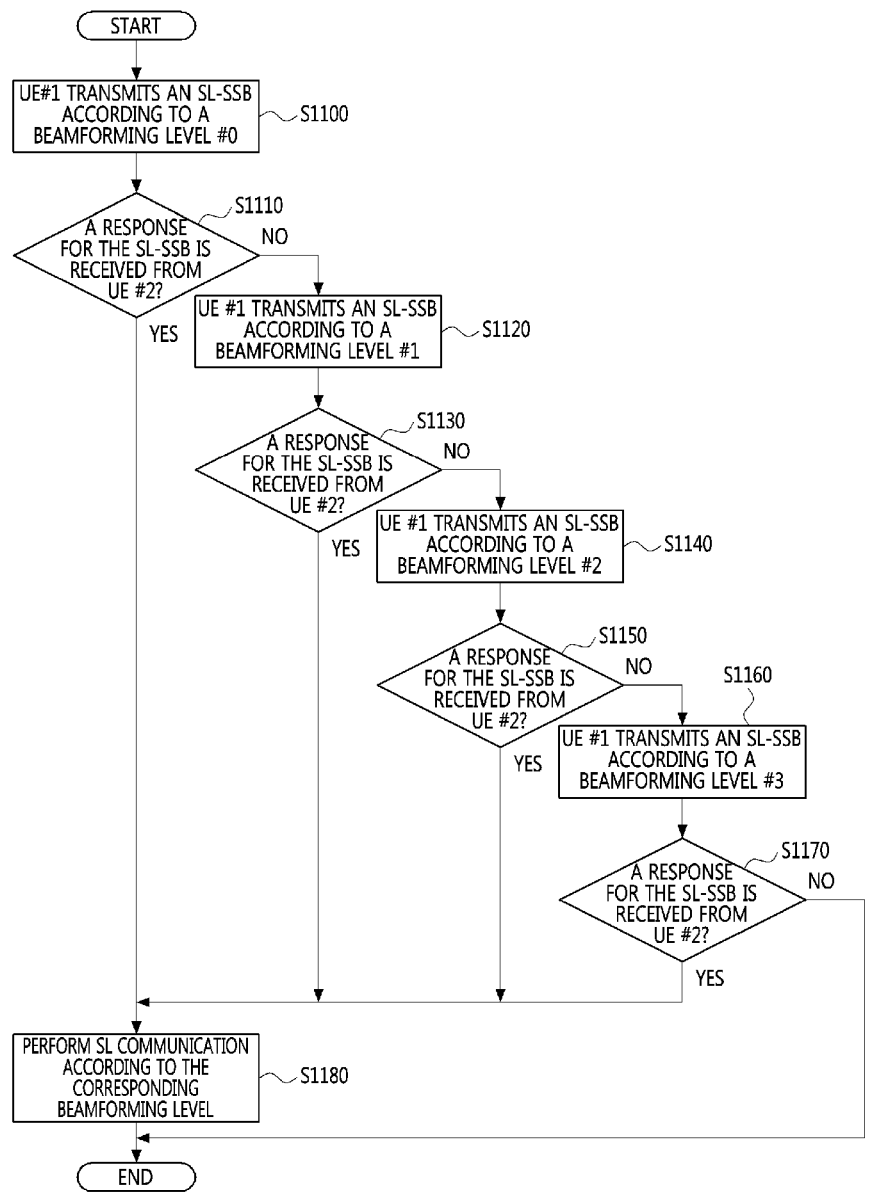
FIG. 11 is a sequence chart illustrating a beamforming-based sidelink communication method in a communication system according to an exemplary embodiment of the present disclosure.

FIG. 11 is a sequence chart illustrating a first exemplary embodiment of a beamforming-based sidelink communication method in a communication system. As shown in FIG. 11, a communication system may include a UE #1 and a UE #2. The UE #1 and the UE #2 may be the UEs 231 to 236 shown in FIG. 2. For example, the UE #1 may be the UE 235 shown in FIG. 2, and the UE #2 may be the UE 236 shown in FIG. 2. The UE #1 and the UE #2 may be connected to a base station and may be located within the coverage of the base station. Alternatively, the UE #1 may be located within the coverage of the base station, and the UE #2 may be located outside the coverage of the base station. The UE #1 and the UE #2 may be configured to be the same as or similar to the communication node 300 shown in FIG. 3. In addition, the UE #1 and the UE #2 may support the protocol stacks shown in FIGS. 4 to 6.

The UE #1 may be configured to transmit a sidelink synchronization signal block (SL-SSB) according to the beamforming level #0 (S1100). In other words, in the step S1100, the SL-SSB may be transmitted in the omni-directional scheme. The SL-SSB may include a sidelink primary synchronization signal (SPSS) and a sidelink secondary synchronization signal (SSSS). Further, the SL-SSB may include one or more of the parameters according to the beamforming level #0 described in Table 5.

The UE #2 may be configured to perform a monitoring operation to receive the SL-SSB. When the SL-SSB is received from the UE #1 and the signal strength of the received SL-SSB is equal to or greater than a preconfigured threshold value (e.g., $T_{SIGNAL}$), the UE #2 may be configured to determine that the sidelink communication between the UE #1 and the UE #2 is possible. In particular, the UE #2 may be configured to transmit a response message for the SL-SSB to the UE #1. The response message may be transmitted in the omni-directional scheme. The response message ma include at least one of signal quality information of the SL-SSB and a speed of the UE #2. Additionally, the response message may be transmitted using a resource configured by the base station or a resource indicated by the SL-SSB. The resource through which the response message is transmitted may be a PSSCH, a PSCCH, or a PSDCH.

The UE #1 may be configured to identify whether the response message for the SL-SSB is received by performing a monitoring operation on the resource configured by the base station or the resource indicated by the SL-SSB (S1110). When the response message is received from the UE #2, the UE #1 may be configured to identify the information included in the response message and determine that the sidelink communication between the UE #1 and the UE #2 is possible. Accordingly, the UE #1 may be configured to perform the sidelink communication with the UE #2 according to the beamforming level #0 (S1180).

On the other hand, when the signal strength of the SL-SSB is less than the preconfigured threshold value (e.g., $T_{SIGNAL}$), the UE #2 may be configured to determine that the sidelink communication between the UE #1 and the UE #2 is impossible. In particular, the UE #2 may not transmit a response message for the SL-SSB to the UE #1. Therefore, the UE #1 may not receive a response message for the SL-SSB from the UE #2.

When the response message for the SL-SSB is not received through the resource configured by the base station or the UE #1, or when the response message for the SL-SSB is not received within a predetermined period of time, the UE #1 may be configured to determine that the sidelink communication between the UE #1 and the UE #2 is impossible. In particular, the UE #1 may be configured to transmit the SL-SSB according to the beamforming level #1, which is the next level of the beamforming level #0 (S1120). In other words, in the step S1120, the SL-SSB may be transmitted in a beamforming scheme (e.g., beam sweeping scheme). For example, the UE #1 may be configured to transmit an SL-SSB using a beam #0 in an interval #0, an SL-SSB using a beam #1 in an interval #1, an SL-SSB using a beam #2 in an interval #2, and an SL-SSB using a beam #3 in an interval #3.

The SL-SSB may include an index of the beam used for transmission of the SPSS, the SSSS, and the SL-SSB. For example, the SL-SSB may include an index of the beam #0 (e.g., '000' in Table 4) when the SL-SSB is transmitted using the beam #0, and the SL-SSB may include an index of the beam #1 (e.g., '001' in Table 4) when the SL-SSB is transmitted using the beam #1. In addition, the SL-SSB may include one or more parameters among the parameters according to the beamforming level #1 described in Table 5.

The UE #2 may be configured to perform a monitoring operation to receive the SL-SSB. When the SL-SSB is received from the UE #1 and the signal strength of the received SL-SSB is equal to or greater than the preconfigured threshold value (e.g., $T_{SIGNAL}$), the UE #2 may be configured to determine that the sidelink communication between the UE #1 and the UE #2 is possible. Alternatively, when the received signal strength of the SL-SSB is equal to or greater than the preconfigured threshold (e.g., $T_{SIGNAL}$) and the speed of the UE #2 is less than or equal to $T_{SPEED}$ indicated by the SL-SSB, the UE #2 may be configured to determine that the sidelink communication between the UE #1 and the UE #2 is possible.

In response to determining that the sidelink communication between the UE #1 and the UE #2 is possible, the UE #2 may be configured to transmit a response message for the SL-SSB to the UE #1. The response message may include at least one of the indices of one or more beams through which the corresponding SL-SSB is received with a received signal strength equal to or greater than $T_{SIGNAL}$, the signal quality information of the corresponding SL-SSB, and the speed of the UE #2. The response message may be transmitted using a resource configured by the base station or a resource indicated by the SL-SSB. The resource through which the response message is transmitted may be a PSSCH, a PSCCH, or a PSDCH.

The response message may be transmitted in the omni-directional scheme or in a specific direction. For example, the UE #2 may be configured to transmit the response message in a direction that corresponds to a direction of receiving the SL-SSB having a received signal strength of $T_{SIGNAL}$ or greater (e.g., the SL-SSB having the largest received signal strength).

When the SL-SSB having the received signal strength equal to or greater than $T_{SIGNAL}$ is received through a plurality of beams, the UE #2 may configure a beam through which the SL-SSB is received with the largest received signal strength as an operation beam (i.e., a beam used for the sidelink communication between the UE #1 and the UE #2), and may configure the remaining beams excluding the operation beam among the plurality of beams as candidate beams. Alternatively, the UE #2 may configure beams adjacent to the operation beam as the candidate beams. In particular, the operation beam may be an optimal beam. The sidelink communication between the UE #1 and the UE #2 may be performed preferentially using the operation beam. The sidelink communication between the UE #1 and the UE #2 may be performed using a candidate beam instead of the operation beam when the quality of the communication using the operation beam is degraded based on a channel state between the UE #1 and the UE #2 (e.g., when a failure of the operation beam occurs).

The UE #1 may be configured to identify whether the response message for the SL-SSB is received by performing a monitoring operation on the resource configured by the base station or the resource indicated by the SL-SSB (S1130). When the response message is received from the UE #2, the UE #1 may be configured to identify the information included in the response message and determine that the sidelink communication between the UE #1 and the UE #2 is possible. Accordingly, the UE #1 may be configured to perform the sidelink communication with the UE #2 according to the beamforming level #1 (S1180). In the step S1180, the sidelink communication may be performed based on analog beamforming. Alternatively, to improve a data transmission rate, the sidelink communication may be performed in the step S1180 based on analog beamforming and digital beamforming (i.e., hybrid beamforming scheme).

Further, when the response message includes indices of a plurality of beams, the UE #1 may configure one (e.g., the beam through which the SL-SSB is received with the largest received signal strength) of the plurality of beams as an operation beam (e.g., optimal beam), and may configure the remaining beams excluding the operation beam among the plurality of beams as candidate beams. Alternatively, the UE #1 may configure beams adjacent to the operation beam as the candidate beams. The operation beam may be used preferentially for the sidelink communication, and the sidelink communication may be performed using a candidate beam when the quality of the communication using the operation beam is degraded. When the signal strength of the SL-SSB is less than the preconfigured threshold (e.g., $T_{SIGNAL}$) or when the signal strength of the SL-SSB is equal to or greater than the preconfigured threshold value (e.g., $T_{SIGNAL}$) and the speed of the UE #2 exceeds $T_{SPEED}$ indicated by the SL-SSB, the UE #2 may be configured to determine that the sidelink communication between the UE #1 and the UE #2 is impossible. In particular, the UE #2 may not transmit the response message for the SL-SSB to the UE #1. Therefore, the UE #1 may not receive the response message for the SL-SSB from the UE #2.

When the response message for the SL-SSB is not received through the resource configured by the base station or the UE #1, or when the response message for the SL-SSB is not received within a preconfigured time, the UE #1 may be configured to determine that the sidelink communication between the UE #1 and the UE #2 is impossible. In particular, the UE #1 may be configured to transmit the SL-SSB according to the beamforming level #2, which is the next level of the beamforming level #1 (S1140).

In other words, in the step S1140, the SL-SSB may be transmitted in a beamforming scheme (e.g., beam sweeping scheme). For example, the UE #1 may be configured to transmit an SL-SSB using a beam #0 in an interval #0, an SL-SSB using a beam #1 in an interval #1, and an SL-SSB using a beam #2 in an interval #2. Also, the UE #1 may transmit an SL-SSB using a beam #3 in an interval #3, an SL-SSB using a beam #4 in an interval #4, and an SL-SSB using a beam #5 in an interval #5.

The SL-SSB may include an index of the beam used for transmission of the SPSS, the SSSS, and the SL-SSB. For example, the SL-SSB may include an index of the beam #0 (e.g., '000' in Table 4) when the SL-SSB is transmitted using the beam #0, and the SL-SSB may include an index of the beam #1 (e.g., '001' in Table 4) when the SL-SSB is transmitted using the beam #1. In addition, the SL-SSB may include one or more parameters among the parameters according to the beamforming level #2 described in Table 5.

The UE #2 may be configured to perform a monitoring operation to receive the SL-SSB. When the SL-SSB is received from the UE #1 and the signal strength of the received SL-SSB is equal to or greater than the preconfigured threshold value (e.g., $T_{SIGNAL}$ L), the UE #2 may be configured to determine that the sidelink communication between the UE #1 and the UE #2 is possible. Alternatively, when the received signal strength of the SL-SSB is equal to or greater than the preconfigured threshold (e.g., $T_{SIGNAL}$) and the speed of the UE #2 is less than or equal to $T_{SPEED}$ indicated by the SL-SSB, the UE #2 may be configured to determine that the sidelink communication between the UE #1 and the UE #2 is possible.

In response to determining that the sidelink communication between the UE #1 and the UE #2 is possible, the UE #2 may be configured to transmit a response message for the SL-SSB to the UE #1. The response message may include at least one of the indices of one or more beams through which the corresponding SL-SSB is received with a received signal strength equal to or greater than $T_{SIGNAL}$, the signal quality information of the corresponding SL-SSB, and the speed of the UE #2. The response message may be transmitted using a resource configured by the base station or a resource indicated by the SL-SSB. The resource through which the response message is transmitted may be a PSSCH, a PSCCH, or a PSDCH. The response message may be transmitted in the omni-direction or in a specific direction. For example, the UE #2 may be configured to transmit the response message in a direction that corresponds to a reception direction of the SL-SSB having a received signal strength of $T_{SIGNAL}$ or greater (e.g., the SL-SSB having the largest received signal strength).

When the SL-SSB having the received signal strength equal to or greater than $T_{SIGNAL}$ is received through a plurality of beams, the UE #2 may configure a beam through which the SL-SSB is received with the largest received signal strength as an operation beam (i.e., a beam used for the sidelink communication between the UE #1 and the UE #2), and may configure the remaining beams excluding the operation beam among the plurality of beams as candidate beams. Alternatively, the UE #2 may configure beams adjacent to the operation beam as the candidate beams. In particular, the operation beam may be an optimal beam. The sidelink communication between the UE #1 and the UE #2 may be performed preferentially using the operation beam. The sidelink communication between the UE #1 and the UE #2 may be performed using a candidate beam instead of the operation beam when the quality of the communication using the operation beam is degraded based on a channel state between the UE #1 and the UE #2 (e.g., when a failure of the operation beam occurs).

The UE #1 may be configured to identify whether the response message for the SL-SSB is received by performing a monitoring operation on the resource configured by the base station or the resource indicated by the SL-SSB (S1150). When the response message is received from the UE #2, the UE #1 may be configured to identify the information included in the response message and determine that the sidelink communication between the UE #1 and the UE #2 is possible. Accordingly, the UE #1 may be configured to perform the sidelink communication with the UE #2 according to the beamforming level #2 (S1180). In the step S1180, the sidelink communication may be performed based on analog beamforming. Alternatively, to improve a data transmission rate, the sidelink communication may be performed in the step S1180 based on analog beamforming and digital beamforming (i.e., hybrid beamforming scheme).

Further, when the response message includes indices of a plurality of beams, the UE #1 may configure one (e.g., the beam through which the SL-SSB is received with the largest received signal strength) of the plurality of beams as an operation beam (e.g., optimal beam), and may configure the remaining beams excluding the operation beam among the plurality of beams as candidate beams. Alternatively, the UE #1 may configure beams adjacent to the operation beam as the candidate beams. The operation beam may be used preferentially for the sidelink communication, and the sidelink communication may be performed using a candidate beam when the quality of the communication using the operation beam is degraded.

When the signal strength of the SL-SSB is less than the preconfigured threshold (e.g., $T_{SIGNAL}$) or when the signal strength of the SL-SSB is equal to or greater than the preconfigured threshold value (e.g., $T_{SIGNAL}$) and the speed of the UE #2 exceeds $T_{SPEED}$ indicated by the SL-SSB, the UE #2 may be configured to determine that the sidelink communication between the UE #1 and the UE #2 is impossible. In particular, the UE #2 may not transmit the response message for the SL-SSB to the UE #1. Therefore, the UE #1 may not receive the response message for the SL-SSB from the UE #2.

When the response message for the SL-SSB is not received through the resource configured by the base station or the UE #1, or when the response message for the SL-SSB is not received within a preconfigured time, the UE #1 may be configured to determine that the sidelink communication between the UE #1 and the UE #2 is impossible. In particular, the UE #1 may be configured to transmit the SL-SSB according to the beamforming level #3, which is the next level of the beamforming level #2 (S1160).

In other words, in the step S1160, the SL-SSB may be transmitted in a beamforming scheme (e.g., beam sweeping scheme). For example, the UE #1 may be configured to transmit an SL-SSB using a beam #0 in an interval #0, an SL-SSB using a beam #1 in an interval #1, an SL-SSB using a beam #2 in an interval #2, and an SL-SSB using a beam #3 in an interval #3. Also, the UE #1 may transmit an SL-SSB using a beam #4 in an interval #4, an SL-SSB using a beam #5 in an interval #5, an SL-SSB using a beam #6 in an interval #6, and an SL-SSB using a beam #7 in an interval #7.

The SL-SSB may include an index of the beam used for transmission of the SPSS, the SSSS, and the SL-SSB. For example, the SL-SSB may include an index of the beam #0 (e.g., '000' in Table 4) when the SL-SSB is transmitted using the beam #0, and the SL-SSB may include an index of the beam #1 (e.g., '001' in Table 4) when the SL-SSB is transmitted using the beam #1. In addition, the SL-SSB may include one or more parameters among the parameters according to the beamforming level #3 described in Table 5.

Further, the UE #2 may be configured to perform a monitoring operation to receive the SL-SSB. When the SL-SSB is received from the UE #1 and the signal strength of the received SL-SSB is equal to or greater than the preconfigured threshold value (e.g., $T_{SIGNAL}$), the UE #2 may be configured to determine that the sidelink communication between the UE #1 and the UE #2 is possible. Alternatively, when the received signal strength of the SL-SSB is equal to or greater than the preconfigured threshold (e.g., $T_{SIGNAL}$) and the speed of the UE #2 is less than or equal to $T_{SPEED}$ indicated by the SL-SSB, the UE #2 may be configured to determine that the sidelink communication between the UE #1 and the UE #2 is possible.

In response to determining that the sidelink communication between the UE #1 and the UE #2 is possible, the UE #2 may be configured to transmit a response message for the SL-SSB to the UE #1. The response message may include at least one of the indices of one or more beams through which the corresponding SL-SSB is received with a received signal strength equal to or greater than $T_{SIGNAL}$, the signal quality information of the corresponding SL-SSB, and the speed of the UE #2. The response message may be transmitted using a resource configured by the base station or a resource indicated by the SL-SSB. The resource through which the response message is transmitted may be a PSSCH, a PSCCH, or a PSDCH. The response message may be transmitted in the omni-direction or in a specific direction. For example, the UE #2 may be configured to transmit the response message in a direction that corresponds to a reception direction of the SL-SSB having a received signal strength of $T_{SIGNAL}$ or more (e.g., the SL-SSB having the largest received signal strength).

When the SL-SSB having the received signal strength equal to or greater than $T_{SIGNAL}$ is received through a plurality of beams, the UE #2 may configure a beam through which the SL-SSB is received with the largest received signal strength as an operation beam (i.e., a beam used for the sidelink communication between the UE #1 and the UE #2), and may configure the remaining beams excluding the operation beam among the plurality of beams as candidate beams. Alternatively, the UE #2 may configure beams adjacent to the operation beam as the candidate beams. In particular, the operation beam may be an optimal beam. The sidelink communication between the UE #1 and the UE #2 may be performed preferentially using the operation beam. The sidelink communication between the UE #1 and the UE #2 may be performed using a candidate beam instead of the operation beam when the quality of the communication using the operation beam is degraded based on a channel state between the UE #1 and the UE #2 (e.g., when a failure of the operation beam occurs).

The UE #1 may be configured to identify whether the response message for the SL-SSB is received by performing a monitoring operation on the resource configured by the base station or the resource indicated by the SL-SSB (S1170). When the response message is received from the UE #2, the UE #1 may be configured to identify the information included in the response message and determine that the sidelink communication between the UE #1 and the UE #2 is possible. Accordingly, the UE #1 may be configured to perform the sidelink communication with the UE #2 according to the beamforming level #3 (S1180). In the step S1180, the sidelink communication may be performed based on analog beamforming. Alternatively, to improve a data transmission rate, the sidelink communication may be performed in the step S1180 based on analog beamforming and digital beamforming (i.e., hybrid beamforming scheme).

Further, when the response message includes indices of a plurality of beams, the UE #1 may configure one (e.g., the beam through which the SL-SSB is received with the largest received signal strength) of the plurality of beams as an operation beam (e.g., optimal beam), and may configure the remaining beams excluding the operation beam among the plurality of beams as candidate beams. Alternatively, the UE #1 may configure beams adjacent to the operation beam as the candidate beams. The operation beam may be used preferentially for the sidelink communication, and the sidelink communication may be performed using a candidate beam when the quality of the communication using the operation beam is degraded.

When the signal strength of the SL-SSB is less than the preconfigured threshold (e.g., $T_{SIGNAL}$) or when the signal strength of the SL-SSB is equal to or greater than the preconfigured threshold value (e.g., $T_{SIGNAL}$) and the speed of the UE #2 exceeds $T_{SPEED}$ indicated by the SL-SSB, the UE #2 may be configured to determine that the sidelink communication between the UE #1 and the UE #2 is impossible. In particular, the UE #2 may not transmit the response message for the SL-SSB to the UE #1. Therefore, the UE #1 may not receive the response message for the SL-SSB from the UE #2. The UE #1 may be configured to determine that the sidelink communication between the UE #1 and the UE #2 is impossible when the response message for the SL-SSB according to the beamforming level #3 which is the final beamforming level is not received. In particular, the UE #1 may be configured to stop the transmission of the SL-SSB.

The exemplary embodiments of the present disclosure may be implemented as program instructions executable by a variety of computers and recorded on non-transitory a computer readable medium. The non-transitory computer readable medium may include a program instruction, a data file, a data structure, or a combination thereof. The program instructions recorded on the non-transitory computer readable medium may be designed and configured specifically for the present disclosure or may be publicly known and available to those who are skilled in the field of computer software.

Examples of the non-transitory computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device may be configured to operate as at least one software module to perform the exemplary embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A method of a first user equipment (UE), comprising:
   transmitting a synchronization signal block (SSB) through each of a plurality of beams of the first UE;
   receiving information of a first beam in which a first SSB is transmitted among the plurality of beams from a second UE;
   determining one or more beams except for the first beam among the plurality of beams as candidate beam(s);
   configuring the candidate beam(s) with the second UE; and
   performing communications with the second UE using the first beam.

2. The method according to claim 1, wherein the candidate beam(s) are used for the communications between the first UE and the second UE when failure of the first beam occurs.

3. The method according to claim 1, wherein the candidate beam(s) are used for the communications between the first UE and the second UE when quality of the communications using the first beam is degraded.

4. The method according to claim 1, wherein the first SSB is one SSB with a largest received signal strength among a plurality of SSBs transmitted through the plurality of beams.

5. The method according to claim 1, wherein the candidate beam(s) are beam(s) of SSB(s) with a received signal strength being equal to or greater than a threshold among a plurality of SSBs transmitted through the plurality of beams.

6. A method of a second user equipment (UE), comprising:
   receiving a synchronization signal block (SSB) through each of a plurality of beams from a first UE;
   determining a first SSB among a plurality of SSBs received through the plurality of beams based on reception quality;
   transmitting information of a first beam in which a first SSB is received among the plurality of beams to the first UE;
   receiving configuration information of candidate beam(s) from the first UE; and
   performing communications with the first UE using the first beam,
   wherein the candidate beam(s) is one or more beams except for the first beam among the plurality of beams.

7. The method according to claim 6, wherein the candidate beam(s) are used for the communications between the first UE and the second UE when failure of the first beam occurs.

8. The method according to claim 6, wherein the candidate beam(s) are used for the communications between the first UE and the second UE when quality of the communications using the first beam is degraded.

9. The method according to claim 6, wherein the first SSB is one SSB with a largest received signal strength among the plurality of SSBs.

10. The method according to claim 6, wherein the candidate beam(s) are beam(s) of SSB(s) with a received signal strength being equal to or greater than a threshold among the plurality of SSBs.

11. A first user equipment (UE), comprising:
a processor; and
a memory storing one or more commands executed by the processor,
wherein the one or more commands are executed to:
transmit a synchronization signal block (SSB) through each of a plurality of beams of the first UE;
receive information of a first beam in which a first SSB is transmitted among the plurality of beams from a second UE;
determine one or more beams except for the first beam among the plurality of beams as candidate beam(s);
configure the candidate beam(s) with the second UE; and
perform communications with the second UE using the first beam.

12. The method according to claim 11, wherein the candidate beam(s) are used for the communications between the first UE and the second UE when failure of the first beam occurs.

13. The method according to claim 11, wherein the candidate beam(s) are used for the communications between the first UE and the second UE when quality of the communications using the first beam is degraded.

14. The method according to claim 11, wherein the first SSB is one SSB with a largest received signal strength among a plurality of SSBs transmitted through the plurality of beams.

15. The method according to claim 11, wherein the candidate beam(s) are beam(s) of SSB(s) with a received signal strength being equal to or greater than a threshold among a plurality of SSBs transmitted through the plurality of beams.

* * * * *